United States Patent
Stapleton et al.

(10) Patent No.: US 6,523,070 B1
(45) Date of Patent: Feb. 18, 2003

(54) COMMUNICATION DEVICE WITH CIRCUITRY TO PROMOTE CASCADE SERIES CONNECTION INCLUDING IDENTIFICATION OF DEVICE POSITION IN THE SERIES AND SENSING THE END DEVICE IN THE SERIES

(75) Inventors: Nicholas Stapleton, Middlesex (GB); Christopher Walker, Hertfordshire (GB); David R. Smith, Hertfordshire (GB); Patrick M. Overs, Bedfordshire (GB)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/230,391

(22) PCT Filed: Jul. 23, 1997

(86) PCT No.: PCT/GB97/01995

§ 371 (c)(1),
(2), (4) Date: Feb. 23, 1998

(87) PCT Pub. No.: WO98/03921

PCT Pub. Date: Jan. 29, 1998

(30) Foreign Application Priority Data

Jul. 23, 1996 (GB) .............................. 9615445

(51) Int. Cl.⁷ ................................. G06F 15/16
(52) U.S. Cl. ................. 709/250; 709/253; 710/126; 710/129
(58) Field of Search ................... 709/225, 226, 709/229, 250, 253; 710/126, 129

(56) References Cited

U.S. PATENT DOCUMENTS

| 4,660,141 A | * | 4/1987 | Ceccon et al. ............. 710/9 |
| 5,120,909 A | * | 6/1992 | Kutz et al. ............. 178/63 R |
| 5,535,336 A | * | 7/1996 | Smith et al. ............. 709/225 |
| 5,812,796 A | * | 9/1998 | Broedner et al. ............. 710/103 |

FOREIGN PATENT DOCUMENTS

| EP | 0266016 | * | 4/1988 |
| WO | 93/16539 | * | 8/1993 |
| WO | WO 94/08305 | * | 4/1994 |
| WO | WO 98/03921 | * | 1/1998 |

* cited by examiner

*Primary Examiner*—Nabil El-Hady
(74) *Attorney, Agent, or Firm*—McDonnell Boehnen Hulbert & Berghoff

(57) ABSTRACT

A communications apparatus comprising a plurality of communication devices each having a plurality of ports and a data bus interconnecting the plurality of units, wherein each device is provided with means enabling the device to detect automatically its position on the data bus.

8 Claims, 5 Drawing Sheets

COMMUNICATION DEVICE WITH CIRCUITRY TO PROMOTE CASCADE SERIES CONNECTION INCLUDING IDENTIFICATION OF DEVICE POSITION IN THE SERIES AND SENSING THE END DEVICE IN THE SERIES

FIELD OF THE INVENTION

The present invention relates to the cascade connection of a plurality of devices so as to enable them to communicate and function together.

In, for example, computer networks comprising a number of users there are provided communication hubs which enable the users to communicate with each other. The communication hub would typically comprise a plurality of ports to which the users would be connected, and would also comprise means to enable the ports to communicate with each other, thereby allowing the different users to communicate. As is well known the connections between the ports may be arranged in various ways, for instance the device may be what is known as a repeater, in which communications received on one port are simply output on all of the other ports, or the device may be what is known as a bridge, in which data received on any port is only output to that port for which it is destined or it may be any other form of communications device. In such an arrangement, the capacity of the network in terms of the number of users which may be connected is limited by the number of ports provided on the communications device. If it is desired to increase the capacity of the network it would of course be possible to replace the communications device with another device having an increased number of ports. However, this is generally considered not to be a good solution both in terms of wastage (the original device becomes redundant) and also in terms of product supply (a manufacturer must have in its product range a potentially large number of differently sized products).

A better approach to the problem is to provide communications devices which may themselves be connected together in what may be considered to be a "stack" such that when the capacity of existing equipment is exhausted further capacity may be added by simply adding an additional device to the stack. In such a stack it is necessary to provide interconnection between the stacked devices via what is known as a cascade connection in order to allow users connected to one device to communicate with users connected to other devices.

SUMMARY OF THE INVENTION

The present invention is concerned with how the cascade connection between stacked devices is implemented and, while it is useful in the above-mentioned context of computer communication networks, it is also useful in any situation where it is desired to be able to stack similar units together and connect them for intercommunication purposes.

BACKGROUND OF THE INVENTION

The present invention aims to facilitate the stacking of devices by a user and to reduce the amount of manual setting up of the stack of devices which is required to be undertaken by a user.

The present invention provides a method of interconnecting a plurality of devices in a communication stack comprising providing means enabling each device to detect automatically its position within the stack.

This automatic detection provided by the present invention enables each of the devices in the stack automatically to be individually identifiable by an external management means, without the need for setting physical switches on the devices by a user, which is open to error. The automatic generation of the position identification for each device means that the stack can be re-configured by addition or removal of devices and these alterations will automatically be taken into account by the stack as a whole.

In one aspect of this invention each unit is able to detect whether it is at the top or the bottom of the stack and in the preferred implementation of this aspect it is only necessary to provide two additional connections in the cascade connection between the devices to provide this function.

In a second aspect the devices which are connected in the stack automatically generate a unique identification which can then be used for the management of the stack. In the preferred implementation this automatic ID generation requires only one additional connection in the cascade.

In a preferred development of the first aspect of the invention the devices are also provided with suitable circuitry for terminating the communication bus which is effectively provided by the cascade connection of the devices and this termination circuitry is switched on to the cascade connection if the device is at the end of the stack.

In one implementation of the invention the devices are connected in cascade by the provision of two connectors on each device and the devices are serially connected together by way of a plurality of cables between the first connector on one box and the second connector on the next box.

In such an arrangement the removal of a device in the middle of the stack causes the stack to be divided in two. In order to avoid the possible disadvantages of this, in a preferred embodiment, a further device is provided which is connected between the cables and each device which enables the removal of a communications device without breaking the cascade connection of the remaining devices.

As mentioned above this invention is particularly applicable to data communication devices in computer networks and in a particular embodiment of this invention due to the low number of extra connections which are required to perform the above-mentioned automatic functions of the cascade, it is possible to provide five independent communication links in the stack using only 25-way connectors for the cascade.

BRIEF DESCRIPTION OF THE DRAWINGS

This invention will be better understood from the following description of a preferred embodiment given by way of example and in conjunction with the accompanying drawings in which.

DETAILED DESCRIPTION

Figure 1:
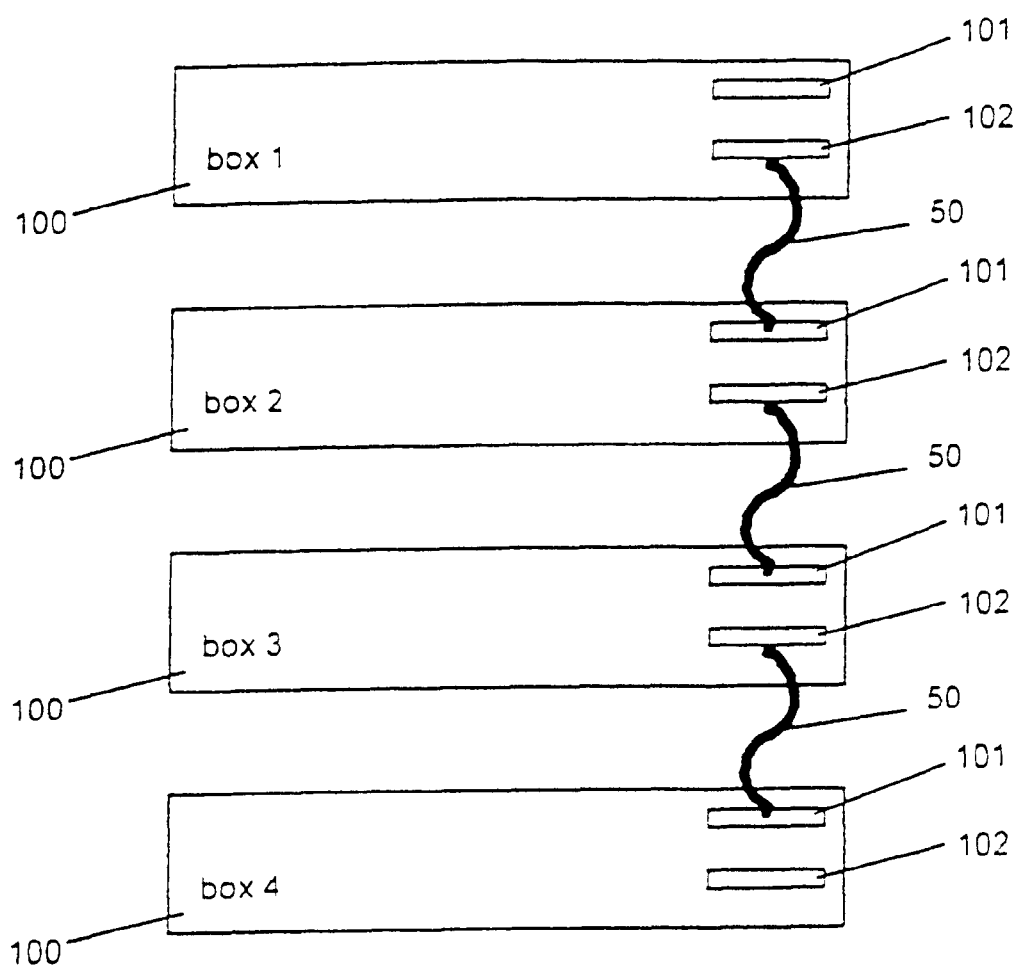
FIG. 1 illustrates the cascade connection of four devices

FIG. 1 illustrates in schematic and illustrative form a plurality of four devices 100 connected in a cascade. Each device comprises a "upstream" connection 101 and a "downstream" connection 102. The devices in the stack are connected by way of cables 50 which connected the downstream connection of one box with the upstream connection of the next box. It is to be understood that the terms "upstream" and "downstream" are used simply to indicate the two directions in the stack. Communication between the devices within the stack takes place in both directions.)

Each cable 50 comprises a plurality of wires which connect to a plurality of pins within the connectors on each device in the stack.

Figure 2:
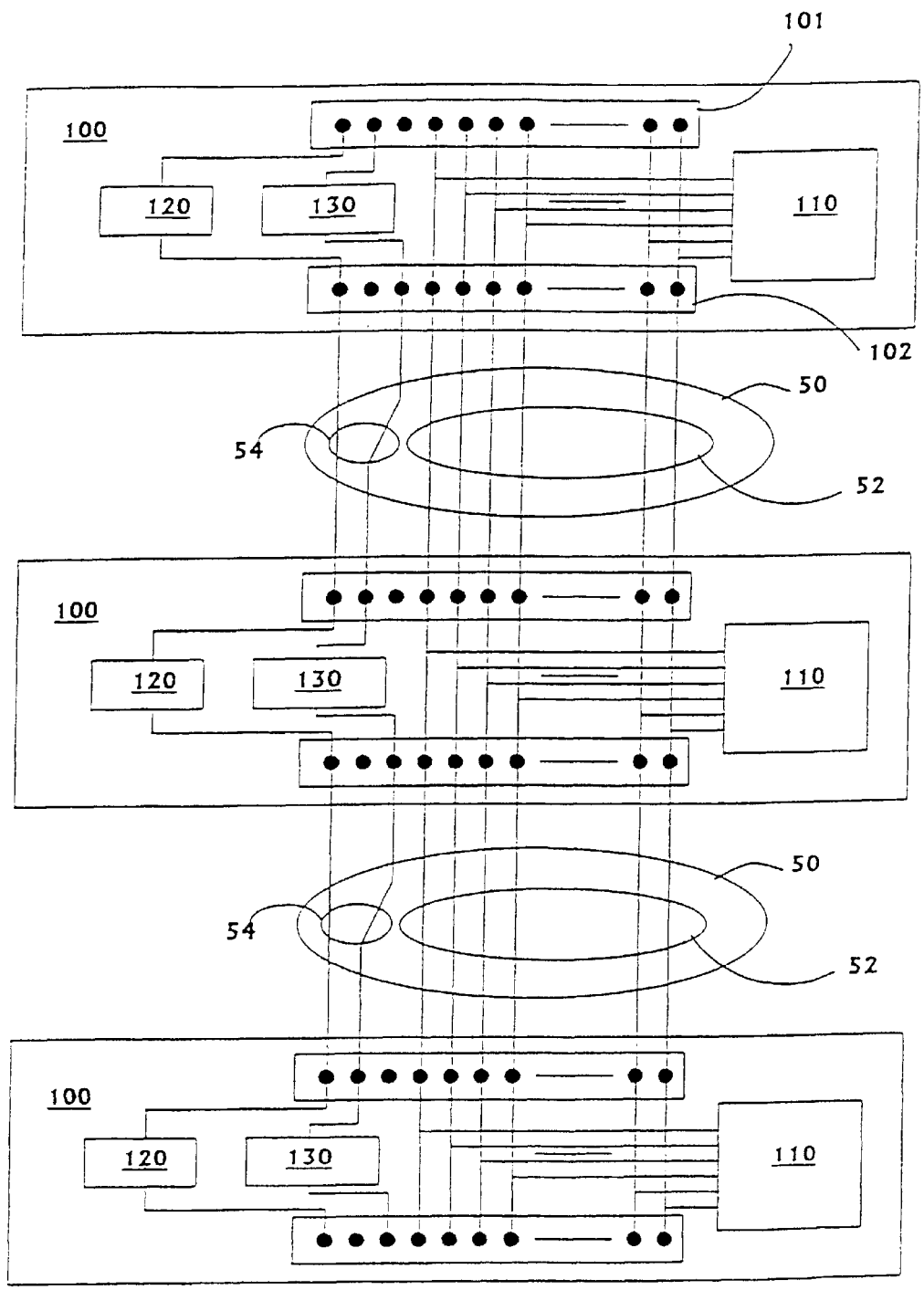
FIG. 2 illustrates in more detail the arrangement of FIG. 1 according to the preferred embodiment

FIG. 2 is a schematic diagram illustrating in more detail the connections formed within the devices within the stack and formed by the connecting cables 50. As is illustrated a subset 52 of the plurality of signals carried by cables 50 is provided to enable two devices in the stack to communicate with each other as desired to provide their normal functions. As shown, these signals 52 are simply transferred in parallel from the upstream connector of one device to the downstream connector of the subsequent device and are also connected in parallel between the upstream and downstream connectors within each device. This effectively provides a communication bus running up the stack and for the purposes of illustration core devices 110 are illustrated within each device 100 which communicate with each other via the communication bus. This communication may be by any method and is not fundamental to the basics of this invention although a specific scheme will be discussed later.

There are additionally provided three pins on each connector on each box which are connected as shown via two wires 54 in cable 50. These connections enable the automatic determination of the positions within the stack by the different devices. Within each device there is provided means 120 for determining the current identification of each device in the stack and also devices 130 which are arranged to sense if the device is at the top or bottom of the stack.

As shown the signal output from each device 120 is connected to the input of the subsequent device 120. This enables each device 100 to generate its own identification based on the identification of the adjacent device in the stack which results in each device in the stack assinging to itself a unique identification code.

Figure 3:
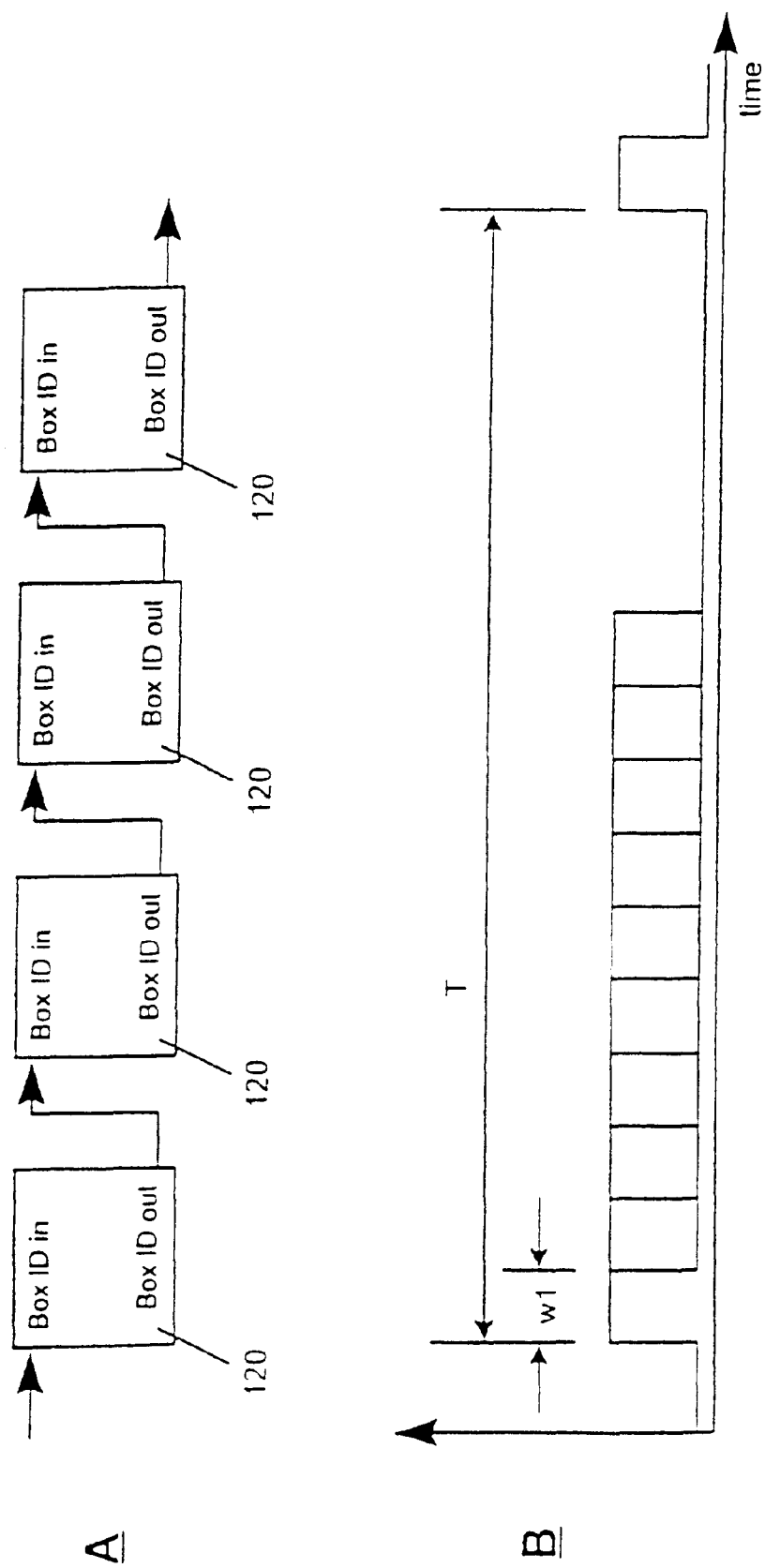
FIG. 3 illustrates the allocation of identification within a stack.

One implementation of this is illustrated in FIG. 3 which illustrates the connections of the device 120. Each of these devices is configured such that when nothing is connected to its input it provides at its output a pulse train in which the width of each pulse is w1 and time between pulses is T. This is illustrated in FIG. 3B. For subsequent devices 120, each device receives the pulse train output by the preceding device and increases the width of the pulses in the pulse train by units of w1, without altering the period T. Each device determines it own identification by measuring the width of the pulses received on the input. Therefore in the configuration illustrated in FIG. 3A the first box 120 takes identification 0, the next takes the identification 1, the next takes the identification 2 and the final box takes identification 3.

The generation of the pulse trains just mentioned takes place continually and therefore any alterations to the size or configuration of the stack are automatically accounted for. For instance, if a further device is added at the top of the stack this automatically takes the next identification available. If a extra device is added at the bottom of the stack, this automatically takes identification number 0, with the other devices renumbering themselves automatically. This configuration therefore ensures that at any given time each device in the stack has a unique identification which is indicative of its relative position within the stack.

Another connection provided by cable 50 runs between units 130 in the devices in the stack. This is provided to enable the devices to detect if they are at the end of the stack. Within each unit 130 there are provided two complementary devices, each of which is capable of detecting whether it is connected to a complementary device in a succeeding device in the stack. If it is determined that both of the complementary devices are so connected then it is established that the device in question is not at the end of the stack. If only one of the complementary devices is so connected then it is established that the device in question is at the end of a stack. Suitable circuitry for comprising devices 130 is illustrated in FIG. 4

Figure 4:
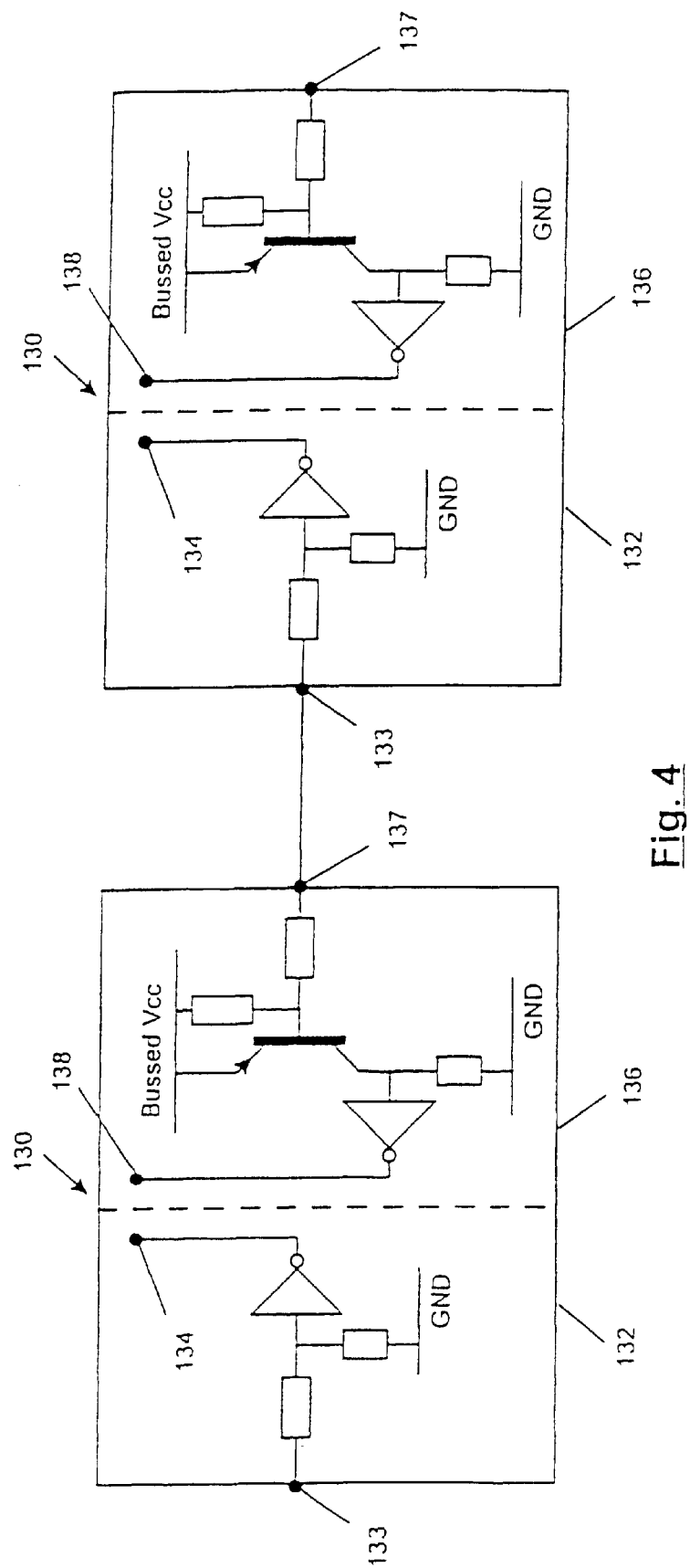
FIG. 4 illustrates the end-of-stack sensing devices.

In FIG. 4 there are shown in schematic form two units 130, each of which comprises two complementary devices 132, 136. Device 132 has terminal 133 which is connected to a terminal in one of the downstream or upstream connectors of the device 100. Device 136 has terminal 137 which is connected to a terminal in the other of the upstream or downstream connectors. Therefore, by way of one of connections 54, for each connection between devices 100 in a stack there is a connection between a terminal 133 and a terminal 137.

Considering first device 132, when there is no connection to terminal 133, as illustrated in the left-hand side of FIG. 4, no current flows through the resistors of device 132 thereby causing a low signal to be applied to the inverting buffer, which in turn applies a high signal to output terminal 134.

In device 136, when no connection is made to terminal 137 as illustrated in the right-hand side of FIG. 4, the transistor is turned off causing no current to flow through the grounded resistor and setting terminal 131 to have a high value.

If a device 132 is connected to a device 136 as illustrated in the central portion of FIG. 4 the interaction between the two devices 132 and 136 means that the signals at terminals 134 and 138 are now low.

It will therefore be appreciated that a low signal on a terminal 134 or 138 indicates that a connection to a succeeding device has been made, while a high signal on terminal 134 or 138 indicates that no connection has been made. Devices 130 can therefore perform a simple logical operation on the outputs of terminals 134,138 to determine if termination of the communication bus is desired. In particular if both signals are low then no termination is required while if one of the signals is high then termination is required.

The input and output side of devices 130 may use the same number pin in each of the upstream and downstream connectors on each device in the stack. However, as illustrated in FIG. 2 it is preferred that the input and output signals use different pins in the upstream and downstream connections and this enables the upstream and downstream connectors to be made physically different thereby, in conjunction with appropriately manufactured cables 50, ensuring that only correct connections can be made between devices in the stack.

As mentioned above the determination of whether a device is at the end of the stack can be used to switch appropriate termination circuitry on to the communication bus 52 to prevent reflections at the end of the bus in a known fashion.

One additional problem which is a stack connected as illustrated in FIGS. 1 and 2 is that if an intermediate device is removed from the stack simply by unplugging the cables 50 to which it is connected this will result in the remaining devices not being able to communicate with each other, because the stack is divided into two.

Figure 5:
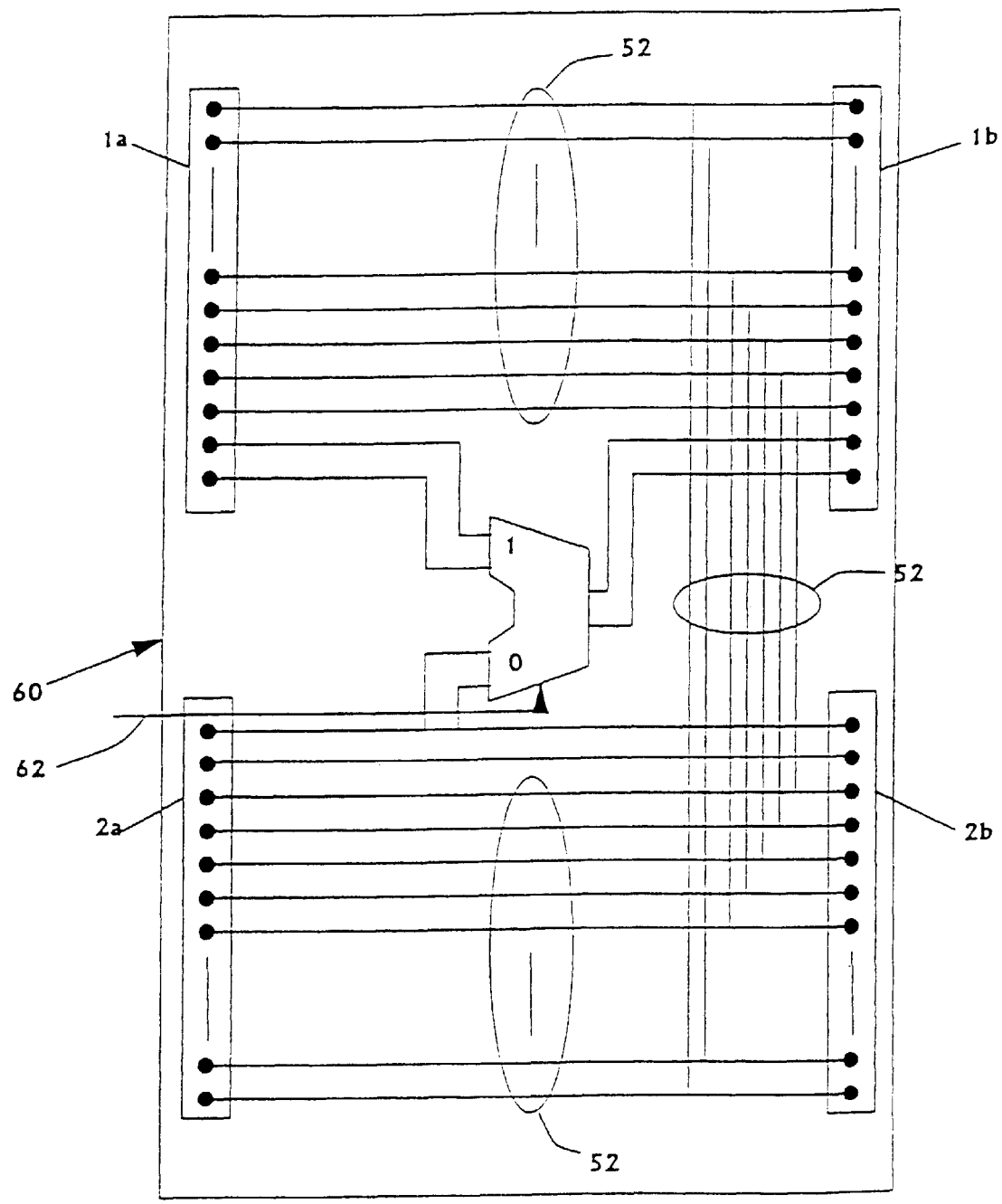
FIG. 5 illustrates the operation of a connecting device according to a particularly preferred embodiment.

Therefore according to a further preferred feature of this invention there is additionally provided a connector for attachment between the devices in the stack and the cables 50. This is illustrated in FIG. 5 and is designated part 60. As illustrated each connecting device 60 comprises connectors 1a and 2a which connect respectively with the upstream and downstream connectors on a device in the stack. The connecting device 60 also comprises connectors 1b and 2b to which cables 50 can be connected. In addition to simply providing a parallel connection for signals 52 between connectors 1a and 1b and between connectors 2a and 2b within connecting device 60, the connecting device also provides a parallel connection for at least signals 52 from connector 1b to connector 2b. The exceptions to this latter feature are the signals 54 which run between devices 120 and 130 as will be discussed in detail below, but it will be appreciated that the parallel connection of signals 52 between connectors 1b and 2b means that even if a device is disconnected from connectors 1a and 2a the communication between the remaining devices in the stack can continue via connectors 1b and 2b to which the cables 50 are attached.

The connecting device 60 comprises means for receiving a signal 62 indicating if connectors 1a and 2a are attached to a device in the stack and if they are not so connected the signals running between devices 120 and 130 are simply bussed between connectors 1b and 2b in the same way as the communication signals. Therefore in this event it is as if the connector circuit 60 was not present and remaining devices in the stack derive their identifications in the normal way as described above.

If however it is determined that device 60 is connected to a device in the stack by connectors 1a and 2a the signals 54 running between devices 120 and 130 are not bussed between connectors 1b and 2b by connecting circuit 60 thereby enabling the device to which connector 60 is attached to be accounted for in the identification scheme described above.

In a particularly preferred embodiment of this invention the above described cascade arrangement is used for connecting a plurality of repeater devices in a local area network (LAN). Each device may comprise four repeaters connecting a plurality of ports to which users may attach. Each such device has five ports which it is desired to connect to the cascade connection. There are therefore provided five ethernet standard communications busses within the bus provided by cable 50, each one of these being provided by three wires. Each of these three wire links comprises one twisted pair which carries data and one extra wire for collision detection as in a normal ethernet connection. This efficient use of signals in the cascade connection means that the five communications channels plus the device identification signals according to this invention described above can all be accommodated in a single 25-way d-type connector. This is advantageous because such connectors are very standard in this field and are therefore available cheaply enabling the devices according to this embodiment of the invention to be manufactured at relatively low cost.

In a preferred configuration there are 11 twisted pairs in the cascade connection. As illustrated in FIG. 2 there is one no fit pin on the cascade-in connector, and one no fit pin on the cascade-out connector. This leaves only one non-twisted pair connection (i.e. a single wire).

In such an arrangement one or both of the no fit pins the cascade-out connector and the cascade-in connector may be polarised to provide the unit present signal to the connecting device 60.

What is claimed is:

1. A network communication device comprising a plurality of ports whereby connection can be made to network equipment and connection means arranged to enable connection to two other similar devices whereby a plurality of said devices may be cascade connected, the device comprising sensing means arranged to sense whether the device is at the end of a series of cascade connection devices, said sensing means comprising:

first and second complementary circuitry providing first and second outputs respectively and having first and second interconnections respectively, the first and second circuitry being arranged whereby said first output has a first value in the event that said first interconnection is connected to a second interconnection in another device and a second value if it is not so connected, and whereby said second output has a first value in the event that said second interconnection is connected to a first interconnection in another device and a second value if it is not so connected; and means arranged to indicate that said device is at the end of a series of cascade connected devices when one of said first and second outputs takes its second value;

wherein said first circuitry comprises means arranged to drive said first interconnection to a first logical level and said first output to take said first value for said second value, dependent on whether current is drawn via said first interconnection, and said second circuitry comprises means arranged to pull said second interconnection to a second logical level and to sense when said second interconnection is driven to said first logical level;

whereby connection between said second circuitry in one device and said first circuitry in other device provides an active signal to said first circuitry of said other device and causes a current driver in series with a resistor in said second circuitry of said one device to drive current through said resistor providing an output of logical level dependent on current flow through the resistor.

2. A network communication device according to claim 1, further comprising a data bus termination device which is activated when it is determined that the device is at the end of a series of cascade connected devices.

3. A network communication device comprising a plurality of ports whereby connections can be made to network equipment and connection means arranged to enable connection to two other similar devices whereby a plurality of said devices may be cascade connected, the device comprising means for determining an identification of its position in a series of cascade connected devices, said means comprising:

an input;

an output arranged to be connected to the input of another device when devices are cascade connected;

means arranged to generate pulses of a predetermined duration and to output said pulses via said output when no signal is received via said input;

means arranged to receive pulses via said input, to increment the duration of said pulses by said predetermined duration and to output said pulses as thus incremented via said output; and means arranged to determine the identification of the position of the device by discriminating on the basis of pulse length determined by the duration of the pulses received at said input.

4. A communication apparatus comprising a plurality of network communication devices each being a device according to claim 3, the devices being interconnected via said connection means to form a data bus.

5. Apparatus according to claim 4 further comprising a cascade connection device connected between said connection means of at least one of said network communication devices and the respective portions of the data bus to enable the removal of that communication device without breaking the cascade connection of the remaining units.

6. A communications apparatus comprising a plurality of network communication devices each being a device according to claim 3, the devices being interconnected via said connection means to form a data bus.

7. Apparatus according to claim 6 further comprising a cascade connection device connected between said connection means of at least of said network communication devices and the respective portions of the data bus to enable the removal of that communication device without breaking the cascade connection of the remaining units.

8. A network communication device comprising a plurality of ports for connection to other network equipment and connection means for connection of the device to two other similar devices whereby a series of devices can be cascade connected, the device comprising sensing means for sensing whether the devices are at an end of said series, said sensing means comprising:

- a first circuit having a first terminal, an amplifier having an input connected to said first terminal, and a first output having a first logical level in the absence of an active signal at said first terminal and a second logical level in the presence of an active signal at said first terminal; and
- a second circuit having a second terminal, a current driver in series with a resistor and having a control terminal coupled to said second terminal and an amplifier having an input coupled to said resistor to provide an output logical level dependent on current flow through said resistor, and means for coupling said second terminal to a voltage rail, whereby connection of said second terminal in one device to said first terminal in other device provides said active signal in said first circuit and causes said current driver to drive current through said resistor.

* * * * *

UNITED STATES PATENT AND TRADEMARK OFFICE
CERTIFICATE OF CORRECTION

PATENT NO.    : 6,523,070 B1
DATED         : February 18, 2003
INVENTOR(S)   : Nicholas Stapleton et al.

It is certified that error appears in the above-identified patent and that said Letters Patent is hereby corrected as shown below:

<u>Title page,</u>
Item [86], the filing date, §371 (c)(1)(2)(4) should be change from "February 23, 1998" to -- February 23, 2000 --.

Signed and Sealed this

Nineteenth Day of August, 2003

JAMES E. ROGAN
*Director of the United States Patent and Trademark Office*